(12) United States Patent
Liu et al.

(10) Patent No.: US 12,541,473 B2
(45) Date of Patent: Feb. 3, 2026

(54) METHOD AND SYSTEM FOR IMPLEMENTING VEHICLE BUS VIRTUAL CHANNEL

(71) Applicant: SHANGHAI TOSUN TECHNOLOGY LTD., Shanghai (CN)

(72) Inventors: Chu Liu, Shanghai (CN); Yueyin Xie, Shanghai (CN); Mang Mo, Shanghai (CN)

(73) Assignee: SHANGHAI TOSUN TECHNOLOGY LTD., Shanghai (CN)

( * ) Notice: Subject to any disclaimer, the term of this patent is extended or adjusted under 35 U.S.C. 154(b) by 87 days.

(21) Appl. No.: 18/380,187

(22) Filed: Oct. 15, 2023

(65) Prior Publication Data
US 2025/0123977 A1 Apr. 17, 2025

(51) Int. Cl.
G06F 13/20 (2006.01)
H04L 12/40 (2006.01)
H04L 41/14 (2022.01)
H04L 41/40 (2022.01)

(52) U.S. Cl.
CPC .................................. G06F 13/20 (2013.01)

(58) Field of Classification Search
CPC .............................. G06F 13/24; G06F 11/328
See application file for complete search history.

(56) References Cited

U.S. PATENT DOCUMENTS

2003/0137194 A1* 7/2003 White ............... B60L 3/12
307/10.1
2005/0154812 A1* 7/2005 DeWitt ............. G06F 13/24
710/260
(Continued)

FOREIGN PATENT DOCUMENTS

CN 102999375 A 3/2013
CN 103248679 A 8/2013
(Continued)

OTHER PUBLICATIONS

Xi Zheng, et al., A Testbed for Security Analysis of Modern Vehicle Systems, 2017 IEEE Trustcom/BigDataSE/ICESS, 2017, pp. 1090-1095.
(Continued)

Primary Examiner — Getente A Yimer
(74) Attorney, Agent, or Firm — Bayramoglu Law Offices

(57) ABSTRACT

A system for implementing a vehicle bus virtual channel, comprising: a computer device, configured to execute client processes and a service end process; wherein, the client processes are configured to send a registration request data packet to the service end process, send a heartbeat packet to the service end process at a particular time interval, and send a vehicle bus packet to the service end process; the service end process is configured to: receive the registration request data packet, the heartbeat packet, and the vehicle bus packet from a client process, set a timestamp of the vehicle bus packet and send the vehicle bus packet back to the client process while modifying a direction attribute of the vehicle bus packet to sending; at the same time, send the vehicle bus packet to other client processes and modify the direction attribute of the vehicle bus packet to receiving.

14 Claims, 3 Drawing Sheets

(56) References Cited

U.S. PATENT DOCUMENTS

| | | | | |
|---|---|---|---|---|
| 2005/0187674 A1* | 8/2005 | Ando | ............... | G06F 8/61 |
| | | | | 701/1 |
| 2005/0228930 A1 | 10/2005 | Ning et al. | | |
| 2007/0150594 A1 | 6/2007 | Andreev et al. | | |
| 2010/0251160 A1* | 9/2010 | Shafi | ............... | G06F 11/328 |
| | | | | 712/E9.032 |

FOREIGN PATENT DOCUMENTS

| | | | |
|---|---|---|---|
| CN | 104994166 | A | 10/2015 |
| CN | 105847332 | A | 8/2016 |
| CN | 106657053 | A | 5/2017 |
| CN | 106686091 | A | 5/2017 |
| CN | 109729061 | A | 5/2019 |
| CN | 110022267 | A | 7/2019 |
| CN | 110098989 | A | 8/2019 |
| CN | 112751870 | A | 5/2021 |
| CN | 114268856 | A | 4/2022 |
| CN | 115695067 | A | 2/2023 |
| CN | 116708070 | A | 9/2023 |
| RU | 2709357 | C2 | 12/2019 |
| WO | 2012173949 | A1 | 12/2012 |
| WO | 2017162054 | A1 | 9/2017 |

OTHER PUBLICATIONS

Maybe_, QueryPerformanceFrequency accurately obtains time, 2017, pp. 1-3, retrieved from: https://blog.csdn.net/Maybe_/article/details/55504946.

Leisure Tribe, Android Heartbeat Package (I)—Heartbeat Mechanism, 2017, pp. 1-9, retrieved from: https://blog.csdn.net/github_27263697/article/details/78594191.

Zhangyanfei01, How is the client port No. determined in a TCP connection?, 2021, pp. 1-13, , retrieved from: https://blog.csdn.net/zhangyanfei01/article/details/118005633.

* cited by examiner

METHOD AND SYSTEM FOR IMPLEMENTING VEHICLE BUS VIRTUAL CHANNEL

TECHNIC FIELD

The present disclosure relates to the field of vehicular software development technologies, and in particular to a method and system for implementing a vehicle bus virtual channel.

BACKGROUND

In order to simulate the communication processes of various vehicle buses on a computer, and provide virtual hardware support for bus tools, various bus tool processes can be connected mutually via virtual hardware to perform real-time communication. In the relevant vehicular software development technologies, data transmission of the virtual buses is usually controlled at the bottom layer of the system by writing a driver program.

SUMMARY

The present disclosure provides a method and system for implementing a vehicle bus virtual channel, including:
creating a service end process as a provider of the virtual channel and monitoring a fixed port of a local computer after being enabled; creating at least one client process, taking each of the at least one client process as a user of the virtual channel, and monitoring a random port of the local computer after being enabled;
sending, by a client process, a registration request data packet to the service end process; successfully receiving, by the service end process, the registration request data packet and then feeding signal reception success back to the client process; after receiving the feedback, sending, by the client process, a heartbeat packet to the service end process at a particular time interval and waiting for a reply of the service end process for the heartbeat packet;
sending, by the client process, a vehicle bus packet to the service end process; if the vehicle bus packet is sent successfully, setting, by the service end process a timestamp of the vehicle bus packet and then sending the vehicle bus packet back to the client process while modifying a direction attribute of the vehicle bus packet to sending; at the same time, sending the vehicle bus packet to other client processes and modifying the direction attribute of the vehicle bus packet to receiving.

The summary of the present disclosure aims to provide brief descriptions for the subjects of the specification. Thus, it should be understood that the above features are only illustrative and shall not be interpreted as narrowing the scope or essence of the subject of the specification in any way.

Other features, aspects and advantages of the subjects of the present disclosure will become apparent by way of the specific embodiments, drawings and claims.

BRIEF DESCRIPTION OF THE DRAWINGS

In order to more clearly describe the technical solutions in the specific embodiments of the present disclosure and in the prior arts, the drawings required for descriptions of the specific embodiments or the prior arts will be briefly introduced below. Apparently, the drawings described herein are merely some embodiments of the present disclosure. Those skilled in the arts can obtain other drawings based on these drawings without making creative work.

DETAILED DESCRIPTION OF THE EMBODIMENTS

Figure 1:
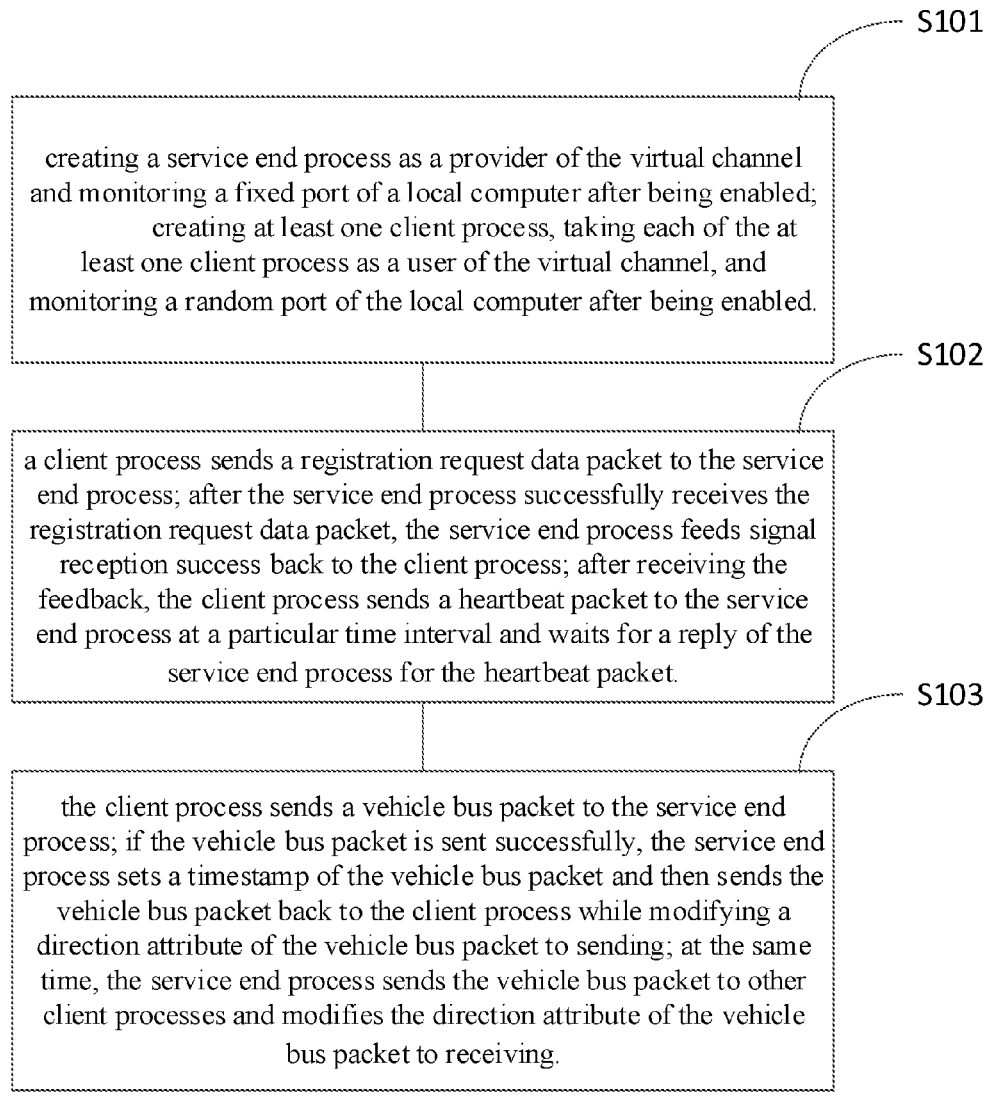
FIG. 1 is a diagram illustrating steps of a method for implementing a vehicle bus virtual channel according to one or more embodiments of the present disclosure.

In order to make the object, technical solutions and advantages of the embodiments of the present disclosure clearer, the technical solutions of the present disclosure will be fully and clearly described in combination with drawings. Apparently, the embodiments described herein are only some embodiments rather than all embodiments. All other embodiments obtained by those skilled in the art based on these drawings without making creative work shall fall within the scope of protection of the present disclosure.

In order to simulate the communication processes of various vehicle buses on a computer, and provide virtual hardware support for bus tools, multiple bus tool processes of different manufacturers can be connected mutually via virtual hardware to perform real-time communication. In the relevant vehicular software development technologies, data transmission of the virtual buses is usually controlled at the bottom layer of the system by writing a driver program. In this way, multiple bus tool processes can be connected mutually via the virtual hardware to realize real-time communication. But, the following problems may occur to the method of controlling data transmission of the virtual buses by writing a driver program:

1) The driver program can be used only after the computer on which the driver program is installed is rebooted the program and thus cannot be used upon opening.
2) The driver program is closely bound to the software system. If a driver program is created on the Windows System to realize a virtual channel, the driver program cannot run in the Linux system due to poor portability.
3) The driver program has poor update capability, namely, the driver program cannot be automatically updated to support new FlexRay bus and Ethernet virtual channel even if supporting the virtual channels of the CAN bus and LIN bus.

Therefore, at least one embodiment of the present disclosure provides:
a method for implementing a vehicle bus virtual channel, which includes: creating a service end process as a provider of the virtual channel and monitoring a fixed port of a local computer based on user datagram protocol (UDP) after being enabled; creating at least one client process, taking each of the at least one client process as a user of the virtual channel, and monitoring a random port of the local computer based on UDP after being enabled; sending, by a client process, a registration request data packet to the service end process; successfully receiving, by the service end process, the registration request data packet and then feeding signal reception success back to the client process; after receiving the feedback, sending, by the client process, a heartbeat packet to the service end process at a particular time interval and waiting for a reply of the service end process for the heartbeat packet; sending, by the client process, a vehicle bus packet to the service end process; if the vehicle bus packet is sent successfully, setting, by the service end process a timestamp of the vehicle bus packet and then sending the vehicle bus packet back to the client process while modifying a direction attribute of the vehicle bus packet to sending; at the same time, sending the vehicle bus packet to other client processes and modifying the direction attribute of the vehicle bus packet to receiving.

The provider of the virtual channel achieves packet routing and data reception and transmission between multiple users of the virtual channel so as to simulate a running mechanism of the packet routing and data reception and transmission in a real network, thus achieving real-time communication as well as real-time simulation.

Various non-limiting implementations of the embodiments of the present disclosure will be detailed below in combination with drawings.

As shown in FIG. 1, one or more embodiments provide a method for implementing a vehicle bus virtual channel, which includes the following steps.

At step S101, creating a service end process as a provider of the virtual channel and monitoring a fixed port of a local computer after being enabled; creating at least one client process, taking each of the at least one client process as a user of the virtual channel, and monitoring a random port of the local computer after being enabled;

At step S102, a client process sends a registration request data packet to the service end process; after the service end process successfully receives the registration request data packet, the service end process feeds signal reception success back to the client process; after receiving the feedback, the client process sends a heartbeat packet to the service end process at a particular time interval and waits for a reply of the service end process for the heartbeat packet.

At step S103, the client process sends a vehicle bus packet to the service end process; if the vehicle bus packet is sent successfully, the service end process sets a timestamp of the vehicle bus packet and then sends the vehicle bus packet back to the client process while modifying a direction attribute of the vehicle bus packet to sending; at the same time, the service end process sends the vehicle bus packet to other client processes and modifies the direction attribute of the vehicle bus packet to receiving.

Specifically, the service end process can provide one or more virtual channels; each client process can use one or more virtual channels.

In some embodiments, after the service end process is enabled, monitoring the fixed port of the local computer based on a User Datagram Protocol (UDP) or a Transmission Control Protocol (TCP); and after each client process is enabled, respectively monitoring the random port of the local computer based on UDP or TCP.

With the implementation of the virtual channel of the vehicular CAN network communication as an example, the method for implementing the vehicle bus virtual channel according to the embodiments of the present disclosure will be detailed below.

For the step S101 in some embodiments:

Firstly, an independent command line process "VirtualCANServer.exe" is created as a service end process of the CAN bus virtual channel, i.e. a provider of the virtual channel. After being enabled, the service end process enables a UDP server carried on itself to monitor a fixed port, for example, 11898.

Secondly, based on use requirements, multiple independent processes are created as client processes of the CAN bus virtual channel, for example, a power assembly client process, a tool client process, a vehicle model client process and a vehicle chassis client process and the like. For ease of descriptions, descriptions on the vehicle chassis client process are emphasized in this case. Specifically, an independent process "Chassis1.exe" is created to simulate the behaviors of the Electronic Control Unit (ECU) on the vehicle chassis, and the process is taken as the client process of the CAN bus virtual channel, i.e. the user of the virtual channel. After being enabled, the client process enables a UDP server carried on itself to monitor a random port, for example, 50000.

For the step S102 in some embodiments:

After being enabled successfully, the client process sends a UDP data packet for registration request to a monitoring port 11898 of the service end process.

After receiving the UDP data packet for registration request, the service end process creates one client process instance including a UDP monitoring port 50000 of the client process and a heartbeat-maintaining counter AliveCounter (an initial value is a maximum tolerance value, for example 10) of the client process, and adds the client process instance to a data distribution queue grouped based on channel. After addition, the service end process sends a UDP data packet for registration confirmation to the monitoring port of the client process.

The client process receives the UDP data packet for registration confirmation from its own monitoring port 50000 and then sets a valid flag of the service end process and finally sends a heartbeat packet for maintaining communication to the monitoring port 11898 of the service end process at a particular time interval (e.g. at a sending frequency of one UPD data packet per second).

After receiving the heartbeat packet from the client process, the service end process resets the heartbeat-maintaining counter AliveCounter of the corresponding client process to a tolerance value, for example, 10. Next, the service end process sends a UDP data packet for heartbeat confirmation to the monitoring port 50000 of the client process, and thus completes a reply for the heartbeat packet.

If the client process receives the UDP data packet for heartbeat confirmation from its own monitoring port 50000, the client process resets its own server feedback counter ServerCounter to a tolerance value. If the client process does not receive the UDP data packet for heartbeat confirmation from its own monitoring port 50000, the server feedback counter ServerCounter is reduced by 1. When the server feedback counter ServerCounter is reduced to 0, the client process reports an error indicating the service end process is offline and the virtual channel is disconnected.

For the step S103 in some embodiments:

When the client process is to send a CAN bus packet, the client process sends a data packet for data reception and transmission, which carries the CAN bus packet, to the service end process. The data packet for data reception and transmission is encoded by compression and encryption and includes attributes such as channel index, Id, data length and data bytes and the like of the CAN bus packet. When the service end process successfully receives the CAN bus packet, the service end process firstly decodes the CAN bus packet and analyzes the channel index carried in the CAN bus packet to determine a virtual channel to which the CAN bus packet is to be routed. Next, the service end process modifies a timestamp carried in the CAN bus packet to a timestamp actively obtained by the service end process after receiving the CAN bus packet.

Next, a data distribution stage is started. The service end process firstly modifies the direction of the CAN bus packet to sending and sends it to the vehicle chassis client process. After receiving the CAN bus packet from its own monitoring port 50000, the client process firstly decodes it to obtain a CAN bus packet with a latest timestamp and hence, the client process can know when the CAN bus packet sent by the client process is replied to by another client process.

Next, the service end process modifies the direction of the CAN bus packet to reception and distributes the CAN bus packet to all corresponding client processes through the data distribution queue of the corresponding virtual channel. After the client process receives the CAN bus packet from its own monitoring port 50000, the client process firstly decodes it to obtain a CAN bus packet with a latest timestamp and thus can know when the ECU simulated by the client process receives the CAN bus packet from the ECUs simulated by other client processes.

In some embodiments, a method of creating the service end process includes:
    after a program of the service end process is enabled, creating a mutex named after a name of the program; if the mutex is already present, failing the creation of the mutex and exiting the process program, and otherwise, creating the mutex successfully and running the process program, and releasing the mutex when the process program is ended;
    after the program is enabled, monitoring a fixed port of the local computer; if failing to monitor, exiting the process program and releasing the mutex.

With the program "VirtualCANServer.exe" of the service end process as the provider of the independent CAN bus virtual channel of the Windows end as an example, the method of creating the service end process is detailed below.

After the program "VirtualCANServer.exe" of the service end process is enabled, a mutex API function "CreateMutex" provided by the software system is called and the mutex is created with the name "VirtualCANServer" of the program of the service end process as the mutex name. Next, an error code is obtained by GetLastError function. If the error code is equal to the system constant "ERROR_ALREADY_EXISTS", it means the mutex is present and creation is failed and the program of the service end process is exited. Otherwise, the program of the service end process enters normal working state.

After the program of the service end process enters normal working state, the UDP monitoring port 11898 is firstly enabled. If the enabling is failed, it indicates the monitoring port is occupied and the service end process reports an error and exits.

When the service end process is exited under normal or abnormal circumstance, if the mutex is already created, the API function "ReleaseMutex" is called to release the created mutex.

In some embodiments, a method of creating at least one client process includes:
    after a program of each client process is enabled, monitoring any random port of the local computer; if failing to monitor, monitoring another random port of the local computer until monitoring successfully.

With the program "Chassis1.exe" of the client process as the user of the CAN bus virtual channel of the Windows end as an example, the method of creating at least one client process is detailed below.

After the program "Chassis1.exe" of the client process is enabled, the client process enables its own UDP server to monitor one random port, for example, 50000. If failing to monitoring, the client process generates another random port, for example, 32768, and continues monitoring the port until monitoring is successful. The successfully-monitored port is 12345, the program of the client process enters normal working state and keeps monitoring the port.

In some embodiments, the registration request data packet includes: a random port number monitored by the client process; and the heartbeat packet includes a random port number monitored by the client process.

In some embodiments, after the client process is successfully enabled, the client process sends a UDP data packet for registration request to the port 11898 of the service end process, where the UDP data packet for registration request carries the UDP monitoring port, for example, 50000, of the client process.

After the client process is successfully registered in the service end process, the client process sends a UDP data packet for maintaining heartbeat to the port 11898 of the service end process, where the UDP data packet for maintaining heartbeat carries the UDP monitoring port, for example, 50000, of the client process.

In some embodiments, setting, by the service end process, the timestamp of the vehicle bus packet includes:
    after being enabled, reading, by the service end process, a current value of a system performance counter and storing the value into a variable T1;
    after receiving the vehicle bus packet from the client process, re-reading, by the service end process, the current value of the system performance counter and storing the value into a variable T2;
    obtaining the timestamp $T=(T2-T1)/F$, wherein F is a frequency of the system performance counter.

When the service end process processes the bus packet, the timestamp is to be set. In the Windows platform, when the service end process is enabled, the frequency of the system performance counter can be obtained by calling QueryPerformanceFrequency system API function and stored into the variable F. Then, by calling QueryPerformanceCounter API function, the current value of the system performance counter is obtained and stored into the variable T1.

When receiving a packet from the client process, the service end process may call QueryPerformanceCounter system API function to obtain the current value of the system performance counter and store the value into the variable T2. In this way, the timestamp of this packet can be obtained as $T=(T2-T1)/F$. For the CAN bus, once the packet sent by the client process is successfully replied to on the bus, the timestamp of the packet is already determined, and all ECUs receiving the packet can obtain the same timestamp.

Figure 2:
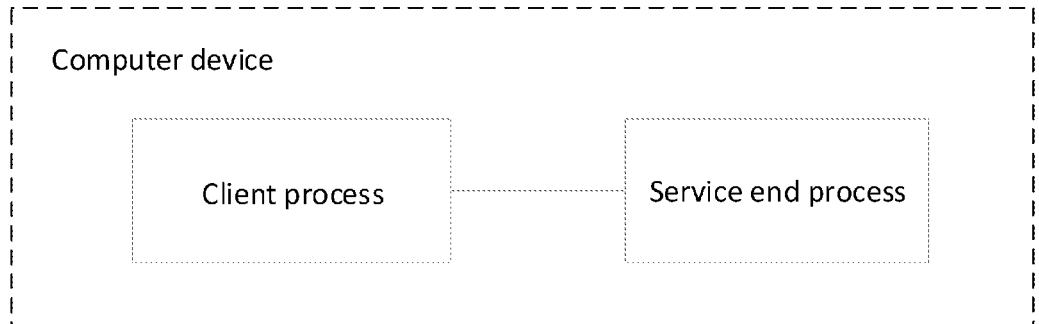
FIG. 2 is a principle block diagram illustrating a system for implementing a vehicle bus virtual channel according to one or more embodiments of the present disclosure.

As shown in FIG. 2, one or more embodiments further provide a system for implementing a vehicle bus virtual channel, including: a computer device, configured to execute the client processes and a service end process;
    the client processes are configured to send a registration request data packet to the service end process, send a heartbeat packet to the service end process at a particular time interval, and send a vehicle bus packet to the service end process;

the service end process is configured as a provider of the virtual channel to: receive the registration request data packet, the heartbeat packet and the vehicle bus packet from a client process, set a timestamp of the vehicle bus packet and send the vehicle bus packet back to the client process while modifying a direction attribute of the vehicle bus packet to sending; at the same time, send the vehicle bus packet to other client processes and modify the direction attribute of the vehicle bus packet to receiving.

In some embodiments, the computer device is further configured to create at least one client process, comprising: after a program of each client process is enabled, monitoring any random port of the local computer; if failing to monitor, monitoring another random port of the local computer until monitoring successfully.

In some embodiments, the registration request data packet comprises: a random port number monitored by the client process; and the heartbeat packet comprises a random port number monitored by the client process.

In some embodiments, setting, by the service end process, the timestamp of the vehicle bus packet comprises: after being enabled, reading, by the service end process, a current value of a system performance counter and storing the value into a variable T1; after receiving the vehicle bus packet from the client process, re-reading, by the service end process, the current value of the system performance counter and storing the value into a variable T2; obtaining the timestamp T=(T2−T1)/F, wherein F is a frequency of the system performance counter.

In some embodiments, after the service end process is enabled, monitoring a fixed port of a local computer based on UDP or TCP; after each client process is enabled, respectively monitoring a random port of the local computer based on UDP or TCP.

Figure 3:
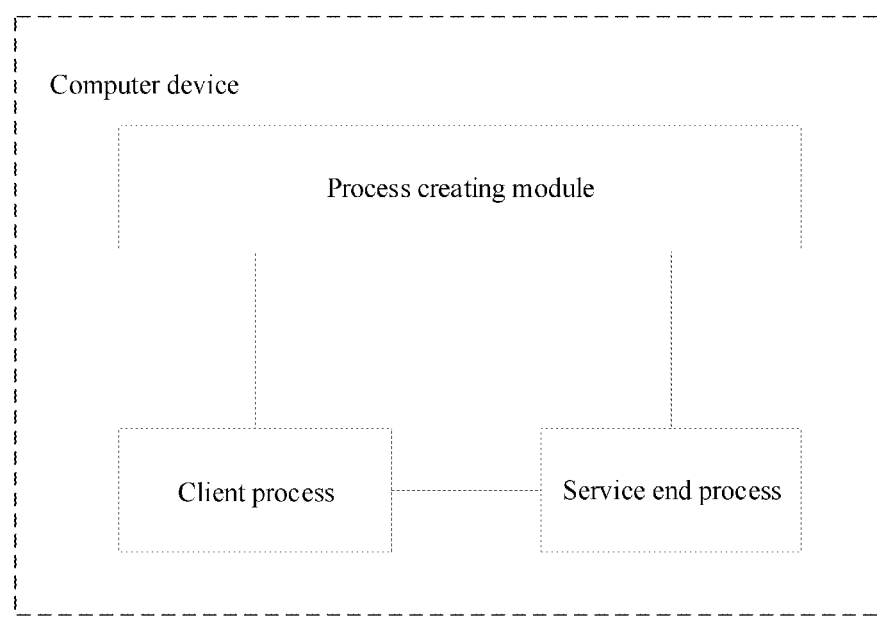
FIG. 3 is a principle block diagram illustrating a system for implementing a vehicle bus virtual channel according to one or more embodiments of the present disclosure.

As shown in FIG. 3, one or more embodiments provide a system for implementing a vehicle bus virtual channel, including a computer device, which is configured to execute a process creating module, client processes and a service end process; where, the process creating module is configured to create a service end process and at least one client process;

the client processes are configured to, as a user of the virtual channel, send a registration request data packet to the service end process, send a heartbeat packet to the service end process at a particular time interval, and send a vehicle bus packet to the service end process;

the service end process is configured to: as a provider of the virtual channel, receive the registration request data packet, the heartbeat packet and the vehicle bus packet from a client process, set a timestamp of the vehicle bus packet and send the vehicle bus packet back to the client process while modifying a direction attribute of the vehicle bus packet to sending; at the same time, send the vehicle bus packet to other client processes and modify the direction attribute of the vehicle bus packet to receiving.

The specific functions of the process creating module, the client processes and the service end process are implemented in the computer device, which can be referred to the contents of the above method for implementing the vehicle bus virtual channel. Thus, no redundant descriptions are made herein.

The processor executes the programs to perform the steps in the embodiments of the method for implementing the vehicle bus virtual channel shown in FIG. 1, for example, the steps S101 to S103 shown in FIG. 1. Alternatively, the processor executes the computer programs to execute the functions of the modules or units in various apparatus embodiments.

In some embodiments, the processor is specifically configured to perform the steps of:

creating a service end process as a provider of the virtual channel and monitoring a fixed port of a local computer after being enabled; creating at least one client process, taking each of the at least one client process as a user of the virtual channel, and monitoring a random port of the local computer after being enabled.

sending, by a client process, a registration request data packet to the service end process; successfully receiving, by the service end process, the registration request data packet and then feeding signal reception success back to the client process; after receiving the feedback, sending, by the client process, a heartbeat packet to the service end process at a particular time interval and waiting for a reply of the service end process for the heartbeat packet;

sending, by the client process, a vehicle bus packet to the service end process; if the vehicle bus packet is sent successfully, setting, by the service end process a timestamp of the vehicle bus packet and then sending the vehicle bus packet back to the client process while modifying a direction attribute of the vehicle bus packet to sending; at the same time, sending the vehicle bus packet to other client processes and modifying the direction attribute of the vehicle bus packet to receiving.

Optionally, as one possible implementation, the processor is further configured to perform the steps of:

a method of creating the service end process, comprising:

after a program of the service end process is enabled, creating a mutex named after a name of the program; if the mutex is already present, failing the creation of the mutex and exiting the process program, and otherwise, creating the mutex successfully and running the process program, and releasing the mutex when the process program is ended;

after the program is enabled, monitoring the fixed port of the local computer; if failing to monitor, exiting the process program and releasing the mutex.

Optionally, as one possible implementation, the processor is further configured to perform the steps of:

a method of creating at least one client process, comprising:

after a program of each client process is enabled, monitoring any random port of the local computer; if failing to monitor, monitoring another random port of the local computer until monitoring successfully.

Optionally, as one possible implementation, the processor is further configured to perform the steps of:

the registration request data packet comprising a random port number monitored by the client process; and the heartbeat packet comprising a random port number monitored by the client process.

Optionally, as one possible implementation, the processor is further configured to perform the steps of:

setting, by the service end process, the timestamp of the vehicle bus packet, comprising:

after being enabled, reading, by the service end process, a current value of a system performance counter and storing the value into a variable T1;

after receiving the vehicle bus packet from the client process, re-reading, by the service end process, the current value of the system performance counter and storing the value into a variable T2;

obtaining the timestamp T=(T2−T1)/F, wherein F is a frequency of the system performance counter.

One or more embodiments of the present disclosure further provide a computer readable storage medium, storing programs of performing the method for implementing the vehicle bus virtual channel, where the programs are executed by a processor to perform the specific steps of the method for implementing the vehicle bus virtual channel, which can be referred to the specific descriptions of the method for implementing the vehicle bus virtual channel and will not be repeated herein.

One or more embodiments of the present disclosure further provide a computer program product, including computer programs or instructions, where the computer programs or instructions are executed on a computer to cause the computer to perform any one of the above methods for implementing the vehicle bus virtual channel.

One or more embodiments of the present disclosure further provide an electronic device, comprising: a memory, storing at least one storage instruction; at least one processor, configured to perform the instructions to cause the processor to perform the operations of: creating a service end process as a provider of the virtual channel and monitoring a fixed port of a local computer after being enabled; creating at least one client process, taking each of the at least one client process as a user of the virtual channel, and respectively monitoring a random port of the local computer after being enabled; sending, by the client process, a registration request data packet to the service end process; successfully receiving, by the service end process, the registration request data packet and then feeding signal reception success back to the client process; after receiving the feedback, sending, by the client process, a heartbeat packet to the service end process at a particular time interval and waiting for a reply of the service end process for the heartbeat packet; sending, by the client process, a vehicle bus packet to the service end process; if the vehicle bus packet is sent successfully, setting, by the service end process, a timestamp of the vehicle bus packet and then sending the vehicle bus packet back to the client process while modifying a direction attribute of the vehicle bus packet to sending; at the same time, sending the vehicle bus packet to other client processes and modifying the direction attribute of the vehicle bus packet to receiving.

In some embodiments, a method of creating the service end process comprises: after a program of the service end process is enabled, creating a mutex named after a name of the program; if the mutex is already present, failing the creation of the mutex and exiting the process program, and otherwise, creating the mutex successfully and running the process program, and releasing the mutex when the process program is ended; after the program is enabled, monitoring the fixed port of the local computer; if failing to monitor, exiting the process program and releasing the mutex.

In some embodiments, a method of creating at least one client process comprises: after a program of the at least one client process is enabled, monitoring any random port of the local computer; if failing to monitor, monitoring another random port of the local computer until monitoring successfully.

In some embodiments, the registration request data packet comprises: a random port number monitored by the client process; and the heartbeat packet comprises a random port number monitored by the client process.

In some embodiments, setting, by the service end process, the timestamp of the vehicle bus packet comprises: after being enabled, reading, by the service end process, a current value of a system performance counter and storing the value into a variable T1; after receiving the vehicle bus packet from the client process, re-reading, by the service end process, the current value of the system performance counter and storing the value into a variable T2; obtaining the timestamp T=(T2−T1)/F, wherein F is a frequency of the system performance counter.

In some embodiments, after the service end process is enabled, monitoring the fixed port of the local computer based on a User Datagram Protocol (UDP) or a Transmission Control Protocol (TCP); and after each client process is enabled, respectively monitoring the random port of the local computer based on UDP or TCP.

In some embodiments, an electronic device, comprising: a memory, storing at least one storage instruction; at least one processor, configured to perform the instructions to cause the processor to perform the operations of: creating a service end process as a provider of the virtual channel and monitoring a fixed port of a local computer after being enabled; creating at least one client process, taking each client process as a user of the virtual channel, and respectively monitoring a random port of the local computer after being enabled; sending, by the client process, a registration request data packet to the service end process; successfully receiving, by the service end process, the registration request data packet and then feeding signal reception success back to the client process; after receiving the feedback, sending, by the client process, a heartbeat packet to the service end process at a particular time interval and waiting for a reply of the service end process for the heartbeat packet; sending, by the client process, a vehicle bus packet to the service end process; if the vehicle bus packet is sent successfully, setting, by the service end process, a timestamp of the vehicle bus packet and then sending the vehicle bus packet back to the client process while modifying a direction attribute of the vehicle bus packet to sending; at the same time, sending the vehicle bus packet to other client processes and modifying the direction attribute of the vehicle bus packet to reception.

An electronic device in some embodiments will be described below from the angle of hardware processing.

Figure 4:
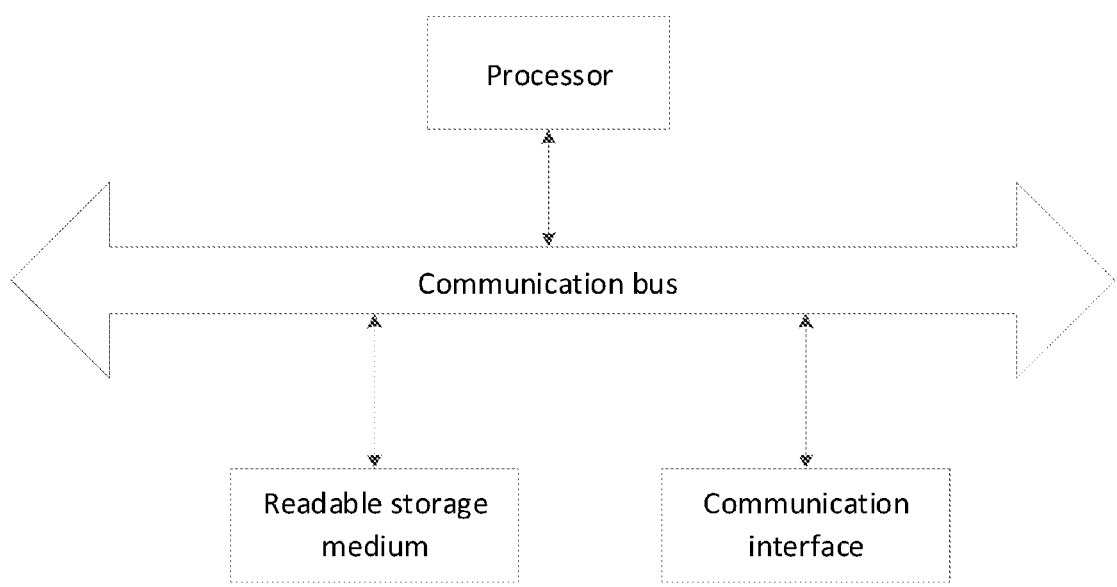
FIG. 4 is a principle block diagram illustrating an electronic device according to some embodiments of the present disclosure.

As shown in FIG. 4, the specific implementation of the electronic device is not limited in some embodiments of the present disclosure.

In some embodiments, the communication interface may be RS232, RS485, USB interface or TYPE interface or the like, which may be connected with an external bus adapter. The communication interface may also include wired or wireless network interface. The network interface may optionally include wired interface and/or wireless interface (such as WI-FI interface, Bluetooth interface and the like), which is usually used to establish communication connection between the server and other computer devices.

The readable storage medium or the computer readable storage medium includes at least one type of memories. The memory includes flash memory, harddisk drive, multimedia card, card type memory (e.g. SD memory or the like), magnetic memory, magnetic disk or compact disk or the like. In some embodiments, the memory may be an internal storage unit in the computer device, for example, a harddisk drive of the computer device. In some other embodiments, the memory may also be an external storage device of the computer device, for example, a plug type hard disk drive, a smart media card (SMC), a secure digital (SD) card, a flash card or the like on the computer device. Furthermore, the memory may include both the internal storage unit in the computer device and the external storage device. The memory may be used to not only store an application software installed on the computer device and various types of data, for example, the codes of the computer programs and the like but also temporarily store data already output or to be output.

In some embodiments, the processor may be a central processing unit (CPU), a processor, a controller, a microcontroller, a microprocessor or another data processing chip, which is used to run the program codes in the memory or process the data, for example, execute the computer programs or the like.

In some embodiments, the communication bus may also be an input/output bus, which may be a Peripheral Component Interconnect (PCI) bus, or an Enhanced Industry Standard Architecture (EISA) bus or the like. The bus may include an address bus, a data bus and a control bus and the like.

Optionally, the computer device may also include a user interface, which may include a display, and an input unit, for example, a keyboard. Optionally, the user interface may also include a standard wired interface and wireless interface. Optionally, in some embodiments, the display may be an LED display, a liquid crystal display, a touch liquid crystal display and an Organic Light-Emitting Diode (OLED) touch display and the like. The display may also be appropriately referred to as display screen or display unit for displaying information processed in the computer device as well as a visual user interface.

In the several embodiments provided by the present disclosure, it should be understood that the disclosed device and method can be implemented another way. The above device embodiments are merely illustrative, for example, the flowcharts or block diagrams in the drawings show possible system architectures, functions and operations of the device, method, and computer program product in the several embodiments provided by the present disclosure. Thus, each block in the flowcharts or block diagrams may represent one module, one program fragment or one part of codes. The module, the program fragment or the part of codes includes one or more executable instructions for implementing the specified logic functions. It should be noted that in some alternative embodiments, the functions indicated in the blocks may also be performed in a sequence different from that indicated in the drawings. For example, two continuous blocks can be actually performed basically in parallel, and sometimes may be performed in a reverse sequence, which is dependent on the functions involved. It is further noted that each block in the block diagrams and/or flowcharts and the combinations of the blocks in the block diagrams and/or flowcharts may be implemented by a dedicated hardware-based system for executing specified functions or actions, or by combination of dedicated hardware and computer instructions.

Furthermore, the functional modules in the embodiments of the present disclosure can be integrated into one independent part, or exist as separate modules or two or more of the modules are integrated into one independent part.

The functions, when implemented by software function modules and sold or used as independent products, can be stored in one computer readable storage medium. Based on such understanding, the essence of technical solutions of the present disclosure, or a part contributing to the prior arts or a part of the technical solutions can be embodied in the form of software product. The computer software product is stored in one storage medium which includes several instructions to enable one computer device (for example, a personal computer, a server, or a network device or the like) to perform all or part of the steps of the method of each of the embodiments of the present disclosure.

Enlightened by the ideal embodiments of the present disclosure, relevant workers can, based on the contents of the specification, make various changes and modifications within the scope of protection of the technical idea of the present disclosure. The technical scope of the present disclosure is not limited to the contents of the specification but to the technical scope claimed by the claims.

What is claimed is:

1. A non-transitory computer readable storage medium, storing computer readable instructions, wherein, the computer readable instructions are configured to cause at least one processor to perform a method for implementing a vehicle bus virtual channel when executing the computer readable instructions, wherein the method comprises:

creating a service end process as a provider of the virtual channel and monitoring a fixed port of a local computer after being enabled; creating at least one client process, taking each of the at least one client process as a user of the virtual channel, and monitoring a random port of the local computer after being enabled;

sending, by a client process, a registration request data packet to the service end process; successfully receiving, by the service end process, the registration request data packet and then feeding signal reception success back to the client process; after receiving a feedback, sending, by the client process, a heartbeat packet to the service end process at a particular time interval and waiting for a reply of the service end process for the heartbeat packet; and sending, by the client process, a vehicle bus packet to the service end process; if the vehicle bus packet is sent successfully, setting, by the service end process a timestamp of the vehicle bus packet and then sending the vehicle bus packet back to the client process while modifying a direction attribute of the vehicle bus packet to sending; at the same time, sending the vehicle bus packet to other client processes and modifying the direction attribute of the vehicle bus packet to receiving, wherein, the setting, by the service end process, the timestamp of the vehicle bus packet comprises:

after being enabled, reading, by the service end process, a current value of a system performance counter and storing the value into a variable T1;

after receiving the vehicle bus packet from the client process, re-reading, by the service end process, the current value of the system performance counter and storing the value into a variable T2; and obtaining the timestamp $T=(T2-T1)/F$, wherein F is a frequency of the system performance counter, wherein T1, T2 and F are positive numbers.

2. The non-transitory computer readable storage medium according to claim 1, wherein, the creating of the service end process comprises:

after a program of the service end process is enabled, creating a mutex named after a name of the program; if the mutex is already present, failing the creation of the mutex and exiting the process program, and otherwise, creating the mutex successfully and running the process program, and releasing the mutex when the process program is ended; and after the program is enabled, monitoring the fixed port of the local computer; if failing to monitor, exiting the process program and releasing the mutex.

3. The non-transitory computer readable storage medium according to claim 1, wherein,
the creating of the at least one client process comprises:
after a program of each client process is enabled, respectively monitoring any random port of the local computer; if failing to monitor, monitoring another random port of the local computer until monitoring successfully.

4. The non-transitory computer readable storage medium according to claim 3, wherein,
the registration request data packet comprises: a random port number monitored by the client process; and
the heartbeat packet comprises a random port number monitored by the client process.

5. The non-transitory computer readable storage medium according to claim 1, wherein,
after the service end process is enabled, monitoring the fixed port of the local computer based on a User Datagram Protocol (UDP) or a Transmission Control Protocol (TCP); and
after each client process is enabled, respectively monitoring the random port of the local computer based on UDP or TCP.

6. An electronic device, comprising:
a memory, storing at least one storage instruction;
at least one processor, configured to perform the instructions to cause the processor to perform the operations of:
creating a service end process as a provider of the virtual channel and monitoring a fixed port of a local computer after being enabled;
creating at least one client process, taking each of the at least one client process as a user of the virtual channel, and respectively monitoring a random port of the local computer after being enabled;
sending, by the client process, a registration request data packet to the service end process; successfully receiving, by the service end process, the registration request data packet and then feeding signal reception success back to the client process; after receiving a feedback, sending, by the client process, a heartbeat packet to the service end process at a particular time interval and waiting for a reply of the service end process for the heartbeat packet; and
sending, by the client process, a vehicle bus packet to the service end process; if the vehicle bus packet is sent successfully, setting, by the service end process, a timestamp of the vehicle bus packet and then sending the vehicle bus packet back to the client process while modifying a direction attribute of the vehicle bus packet to sending; at the same time, sending the vehicle bus packet to other client processes and modifying the direction attribute of the vehicle bus packet to receiving,
wherein the setting, by the service end process, the timestamp of the vehicle bus packet comprises:
after being enabled, reading, by the service end process, a current value of a system performance counter and storing the value into a variable T1;
after receiving the vehicle bus packet from the client process, re-reading, by the service end process, the current value of the system performance counter and storing the value into a variable T2; and
obtaining the timestamp $T=(T2-T1)/F$, wherein F is a frequency of the system performance counter, wherein T1, T2 and F are positive numbers.

7. The electronic device according to claim 6, wherein,
a method of creating the service end process comprises:
after a program of the service end process is enabled, creating a mutex named after a name of the program; if the mutex is already present, failing the creation of the mutex and exiting the process program, and otherwise, creating the mutex successfully and running the process program, and releasing the mutex when the process program is ended; and
after the program is enabled, monitoring the fixed port of the local computer; if failing to monitor, exiting the process program and releasing the mutex.

8. The electronic device according to claim 6, wherein,
a method of creating at least one client process comprises:
after a program of the at least client process is enabled, monitoring any random port of the local computer; if failing to monitor, monitoring another random port of the local computer until monitoring successfully.

9. The electronic device according to claim 8, wherein,
the registration request data packet comprises: a random port number monitored by the client process; and
the heartbeat packet comprises a random port number monitored by the client process.

10. A system for implementing a vehicle bus virtual channel, comprising: a computer device, configured to execute client processes and a service end process; wherein,
the client processes are configured to send a registration request data packet to the service end process, send a heartbeat packet to the service end process at a particular time interval, and send a vehicle bus packet to the service end process;
the service end process is configured to: receive the registration request data packet, the heartbeat packet and the vehicle bus packet from a client process, set a timestamp of the vehicle bus packet and send the vehicle bus packet back to the client process while modifying a direction attribute of the vehicle bus packet to sending; at the same time, send the vehicle bus packet to other client processes and modify the direction attribute of the vehicle bus packet to receiving,
wherein the setting, by the service end process, the timestamp of the vehicle bus packet comprises:
after being enabled, reading, by the service end process, a current value of a system performance counter and storing the value into a variable T1;
after receiving the vehicle bus packet from the client process, re-reading, by the service end process, the current value of the system performance counter and storing the value into a variable T2; and
obtaining the timestamp $T=(T2-T1)/F$, wherein F is a frequency of the system performance counter, wherein T1, T2 and F are positive numbers.

11. The system for implementing the vehicle bus virtual channel according to claim 10, wherein,
the computer device is further configured to create the service end process, comprising:
after a program of the service end process is enabled, creating a mutex named after a name of the program; if the mutex is already present, failing the creation of the mutex and exiting the process program, otherwise, creating the mutex successfully and running the process program, and releasing the mutex when the process program is ended; and after the program is enabled, monitoring a fixed port of a local computer; if failing to monitor, exiting the process program and releasing the mutex.

12. The system for implementing the vehicle bus virtual channel according to claim 10, wherein, the computer device is further configured to create at least one client process, comprising:

after a program of each client process is enabled, monitoring any random port of the local computer; if failing to monitor, monitoring another random port of the local computer until monitoring successfully.

13. The system for implementing the vehicle bus virtual channel according to claim 12, wherein, the registration request data packet comprises: a random port number monitored by the client process; and the heartbeat packet comprises a random port number monitored by the client process.

14. The system for implementing the vehicle bus virtual channel according to claim 10, wherein, after the service end process is enabled, monitoring a fixed port of a local computer based on UDP or TCP; and after each client process is enabled, monitoring a random port of the local computer based on UDP or TCP.

* * * * *